US009449156B2

(12) United States Patent
Kafka et al.

(10) Patent No.: US 9,449,156 B2
(45) Date of Patent: Sep. 20, 2016

(54) USING TRUSTED DEVICES TO AUGMENT LOCATION-BASED ACCOUNT PROTECTION

(71) Applicant: Microsoft Corporation, Redmond, WA (US)

(72) Inventors: Steven Kafka, Mountain View, CA (US); Richard Craddock, San Francisco, CA (US); Ashutosh Tewari, Fremont, CA (US); Krish Vitaldevara, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/632,170

(22) Filed: Oct. 1, 2012

(65) Prior Publication Data

US 2014/0096189 A1 Apr. 3, 2014

(51) Int. Cl.
*G06F 7/04* (2006.01)
*G06F 21/31* (2013.01)

(52) U.S. Cl.
CPC ........ *G06F 21/31* (2013.01); *G06F 2221/2111* (2013.01)

(58) Field of Classification Search
CPC .... H04L 63/107; H04L 9/0872; G06F 21/30
USPC .................. 726/1, 4, 7, 28, 3; 455/418, 411; 709/224, 225; 370/310, 338
See application file for complete search history.

(56) References Cited

U.S. PATENT DOCUMENTS

| | | | |
|---|---|---|---|
| 6,397,065 B1* | 5/2002 | Huusko et al. | 455/435.2 |
| 7,203,753 B2* | 4/2007 | Yeager et al. | 709/225 |
| 7,480,801 B2* | 1/2009 | Euchner | H04L 63/0823 370/328 |
| 7,668,123 B1* | 2/2010 | Scott et al. | 370/310 |
| 7,836,487 B2* | 11/2010 | Walker Pina | H04L 63/0815 713/168 |
| 8,156,539 B1* | 4/2012 | Nelson | H04L 63/107 455/456.1 |
| 8,176,077 B2* | 5/2012 | Stevens | G06F 17/3087 707/782 |
| 8,402,512 B2* | 3/2013 | Tam et al. | 726/3 |
| 8,447,332 B2* | 5/2013 | Weinreich | G01S 5/0036 370/338 |
| 8,489,071 B2* | 7/2013 | Mechaley, Jr. | H04L 63/18 455/411 |

(Continued)

OTHER PUBLICATIONS

Ron Shacham, Architecture for location-based service mobility using the SIP event Model, Mar. 2004, Psu.Edu, vol. 1, pp. 1-6.*

(Continued)

*Primary Examiner* — Dede Zecher
*Assistant Examiner* — Viral Lakhia
(74) *Attorney, Agent, or Firm* — Damon Rieth; Sade Fashokun; Micky Minhas

(57) ABSTRACT

An authentication process receives information identifying a user, a device used by the user and a location in which the device is being used. That authentication process determines whether the location is among a set of familiar locations stored about the user for a service being accessed. If the location is not among the set of familiar locations, then the user is not authenticated. A desirable user experience can be obtained by using information about any existing relationship, such as a synchronization relationship, between the device and the service established at a prior familiar location. Instead of challenging a user whose device is in an unfamiliar location, the authentication process determines whether the device has a relationship established with the service. If the device has a relationship established with the service, then the set of familiar locations is updated to include the location in which the device is being used.

17 Claims, 5 Drawing Sheets

(56) References Cited

U.S. PATENT DOCUMENTS

| | | | |
|---|---|---|---|
| 8,561,142 B1* | 10/2013 | Sobel | 726/3 |
| 8,578,454 B2* | 11/2013 | Grim | 726/4 |
| 8,589,541 B2* | 11/2013 | Raleigh et al. | 709/224 |
| 8,601,268 B2* | 12/2013 | Judell | H04L 9/30 370/338 |
| 8,824,372 B2* | 9/2014 | Hoggan | H04L 63/107 370/328 |
| 8,831,563 B2* | 9/2014 | Martell et al. | 455/410 |
| 8,831,570 B2* | 9/2014 | Garskof | G06F 21/35 380/247 |
| 8,914,302 B2* | 12/2014 | Rose | G06Q 20/02 705/1.1 |
| 9,329,877 B2* | 5/2016 | Donaldson | G06F 9/44589 |
| 2007/0101438 A1* | 5/2007 | Govindarajan | G06F 21/6218 726/27 |
| 2008/0172715 A1 | 7/2008 | Geiger et al. | |
| 2009/0300168 A1 | 12/2009 | Guo et al. | |
| 2010/0024017 A1* | 1/2010 | Ashfield et al. | 726/7 |
| 2010/0199086 A1 | 8/2010 | Kuang et al. | |
| 2010/0199338 A1 | 8/2010 | Craddock et al. | |
| 2010/0211997 A1 | 8/2010 | McGeehan et al. | |
| 2011/0247055 A1 | 10/2011 | Guo et al. | |
| 2011/0252132 A1 | 10/2011 | Wetzer et al. | |
| 2011/0296513 A1* | 12/2011 | Kasad | G06F 21/35 726/9 |
| 2012/0030771 A1* | 2/2012 | Pierson et al. | 726/26 |
| 2012/0042160 A1* | 2/2012 | Nakhjiri et al. | 713/151 |
| 2012/0167188 A1* | 6/2012 | Poornachandran et al. | 726/7 |
| 2012/0173869 A1* | 7/2012 | Stinson, III | H04L 63/0236 713/153 |
| 2012/0203568 A1* | 8/2012 | Francis | G06Q 30/06 705/2 |
| 2012/0216298 A1* | 8/2012 | Jaudon et al. | 726/28 |
| 2013/0014212 A1* | 1/2013 | Cohen | 726/1 |
| 2013/0031001 A1* | 1/2013 | Frechette | G06Q 20/3224 705/44 |
| 2013/0036459 A1* | 2/2013 | Liberman | H04L 9/0866 726/6 |
| 2013/0111554 A1* | 5/2013 | Sposato et al. | 726/4 |
| 2013/0191887 A1* | 7/2013 | Davis | H04L 63/0823 726/5 |
| 2013/0308618 A1* | 11/2013 | Panneerselvam | G01S 5/0236 370/338 |

OTHER PUBLICATIONS

Sharp, et al., "Enhancing Web Browsing Security on Public Terminals Using Mobile Composition", Retrieved at <<http://anil.recoil.org/papers/2008-mobisys-splittrust.pdf>>, In Proceeding MobiSys '08 Proceedings of the 6th international conference on Mobile systems, applications, and services, Retrieved Date: May 30, 2012, pp. 12.

Oprea, et al., "Securing a Remote Terminal Application with a Mobile Trusted Device", Retrieved at <<http://www.rsa.com/rsalabs/staff/bios/aoprea/publications/acsac.pdf/>>,In Proceeding ACSAC '04 Proceedings of the 20th Annual Computer Security Applications Conference, May 30, 2012, pp. 10.

"International Search Report & Written Opinion for PCT Patent Application No. PCT/US2013/060405", Mailed Date: Nov. 21, 2013, Filed Date: Sep. 18, 2013, 9 Pages.

* cited by examiner

USING TRUSTED DEVICES TO AUGMENT LOCATION-BASED ACCOUNT PROTECTION

BACKGROUND

User authentication is an important aspect of providing security for various computer systems, especially services for consumers on a publicly accessible computer system such as the Internet. Such services include, but are not limited to, electronic mail, remote storage, social networking applications and the like, In addition to conventional user name and password combinations, some services include other authentication measures. For example, a sequence of secret questions and answers can be presented to the user. As another example, a device identifier, such as a serial number for the device itself, or for one or more components of the device, or other identifier such as a media access control (MAC) address, can be used to authenticate the user, The location of the user also can be used to further verify or question the authenticity of the user. This location can be derived from computer network addresses, such as the internet protocol (IP) address used by the computer, from global position system (GPS) information and the like. For example, a system can maintain, for each user, a list of familiar locations from which the user is known to access the system. If the user attempts to access the system from an unfamiliar location, the user can be prompted for more information before the user is authenticated and access to the system is permitted.

SUMMARY

This Summary is provided to introduce a selection of concepts in a simplified form that are further described below in the Detailed Description, This Summary is not intended to identify key features or essential features of the claimed subject matter, nor is it intended to be used to limit the scope of the claimed subject matter.

An authentication process receives information identifying a user, a device used by the user to access a service and a location in which the device is being used. That authentication process determines whether the location is among a set of familiar locations stored about the user for the service being accessed. If the location is not among a set of familiar locations stored for the user, for example if the user is traveling and is in an unfamiliar location, then the user is not authenticated. For example, the user can be prompted for additional authentication information, or access can be denied, or a security event can be signaled.

However, a desirable user experience can be obtained by using information about any existing relationship between the device and the service which was established at a prior familiar location. An example of such a relationship is a synchronization relationship where the service maintains synchronization with a device, So, instead of challenging or requiring further authentication information from a user whose location is unfamiliar, the authentication process determines whether the device has a relationship established with the service being accessed.

If the device has a relationship established with the service being accessed, then the set of familiar locations is updated to include the location in which the device is being used. Thus, when the device is moved to anew location, the relationship indicates the device is trusted by the service, and the location information can be updated.

On the other hand, if the device does not have a relationship established with the service being accessed, and if the location is not among a set of familiar locations stored for the user, then access to the service can be denied, or the user can be prompted for additional information, or a security event can be signaled, Additional devices used by the user in the new location can benefit from a first device having a relationship with the service. For example, if the user accesses the service with a second device in the new location after accessing the service with the first device, the set of familiar locations is updated due to the relationship of the first device. Thus, access to the service on the second device will not be denied because of the new location. Additionally, unsuccessful attempts to establish a relationship with new devices and/or new locations can be used to signal security events.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a service using location-based account protection is augmented by using information about trusted devices. A trusted device is a device that has a predetermined relationship with the service, such as a synchronization relationship which synchronizes the device with the service. The example below in FIGS. 1 through 4 illustrates a system that uses a synchronization relationship between a device and a service. Other relationships in which the service is communicating with a known and trusted device can be used as an alternative to a synchronization relationship.

Figure 1:
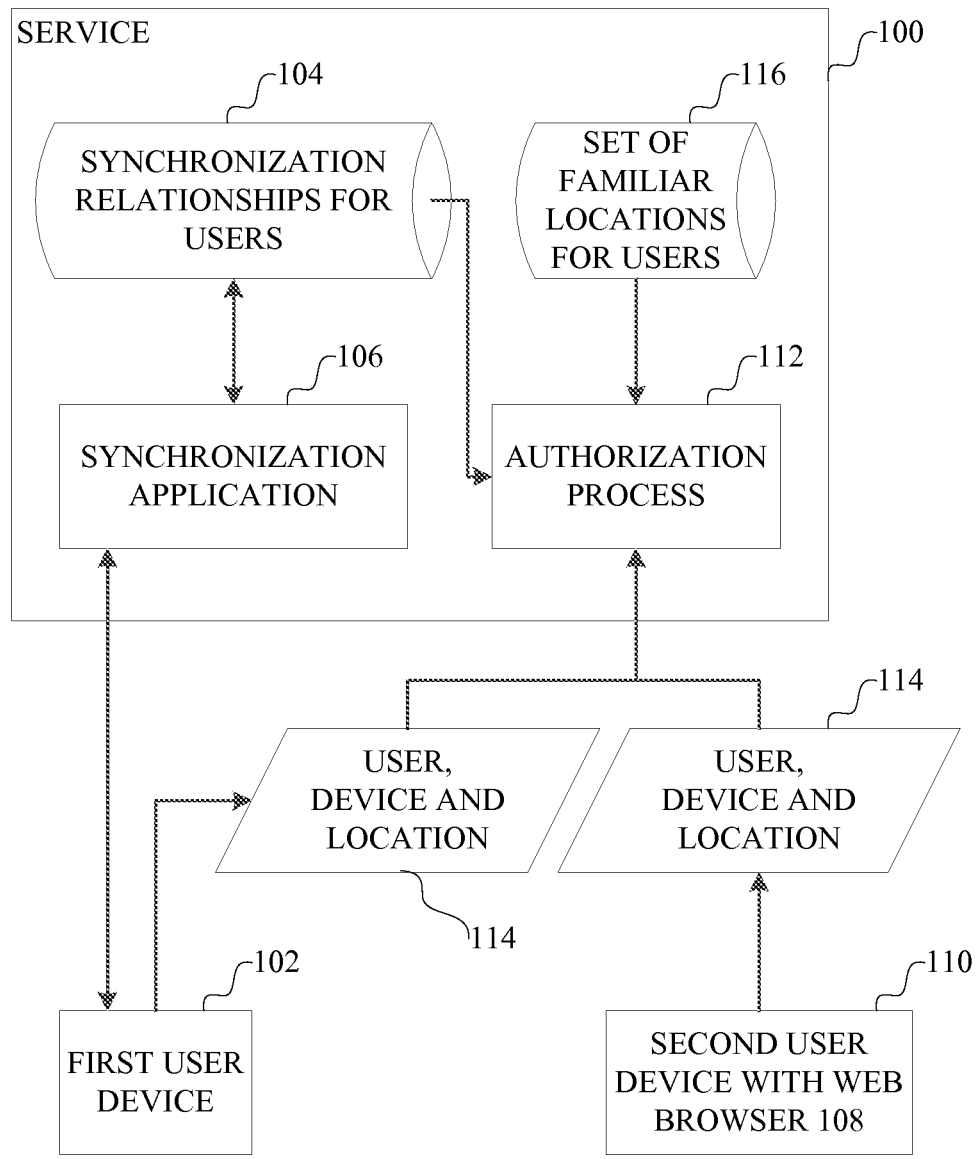
FIG. 1 is a block diagram of a system which uses a relationship between a &vice and a service to augment user authentication.

Referring to FIG. 1, an application or service 100 allows a device 102 to synchronize data between the device and the service. Such synchronization capability is commonly found in, for example, applications for electronic mail, calendar, contacts (address book), social media and cloud-based storage. The service 100 maintains information 104, typically in a database, that relates a user's device 102 with the user's account with the service 100. This information is used by a synchronization application 106 that synchronizes data on the device 102 with data maintained by the service 100. Examples of information that is tracked to determine whether there is a sync relationship when a device accesses a service includes, but is not limited to, a synchronization key. The synchronization key includes data about a time with the device was last synchronized and is coupled with a user identifier and a device ID (a unique identifier of the user device).

Such applications or services also generally allow a user to access the service through a conventional web browser 108 or similar application on another computing device 110, such as a personal computer, whether desktop, laptop or tablet computer, or smart phone.

The service typically has an authentication process 112 that presents a user interface to allow the user to login. When the user logs in, the authentication process receives information 114 about the user, such as a user name and password. The authentication process also can receive information about the device and the user's location.

The information about the device can include, for example, a device identifier, such as a serial number for the device itself, or for one or more components of the device, or other identifier such as a media access control (MAC) address, can be used to authenticate the user The information about the location can be derived from computer network addresses, such as the internet protocol (IP) address used by the computer, from global position system (GPS) information and the like.

The authentication process 112 uses location information as an additional factor in deciding whether to authorize access to an account. In particular, for each user, the authentication process maintains a database 116 that includes a set of familiar locations of the user from which the user has previously accessed the service 100. If a user attempts to access the service 100 from a location not in the set of familiar locations, then the authentication process 112 can prompt the user for additional authentication data, as indicated at 118.

However, if the user device 102 has a relationship with the service 100, then the set of familiar locations can be updated to include the current location of the user device 102. Thus, instead of prompting the user for additional authentication data, the authentication process 112 accesses the information about relationships between the service and devices, such as synchronization relationships, and updates the set of locations if such a relationship exists.

Updating the familiar location information for a user based on a relationship for one device is particularly useful if the user has two or more devices. For example, a user may be traveling with a smart phone and a laptop computer. The smart phone is set to synchronize electronic mail, calendar and contact information with a user's account. The user checks into a hotel and accesses the internet with a laptop computer and attempts to access the user's account. Because of the synchronization relationship with the smart phone and the account, the user's location at the hotel is added to the list of familiar locations for that user. Thus, when the user accesses the account with the laptop computer which does not have a relationship with the service providing the user's account, access neither involves prompting the user for further information nor is denied due to the new location of the user.

In addition, other security measures can be implemented using the relationship information. For example, if a user attempts to establish a synchronization relationship from a new location, and is unsuccessful, a security event can be signaled. The user or system administrator could be notified of the attempt. If successful, the new location can be added to familiar locations of the user.

Given this context, an example implementation of such a system will be described in more detail in connection with FIGS. 2-4.

Figure 2:
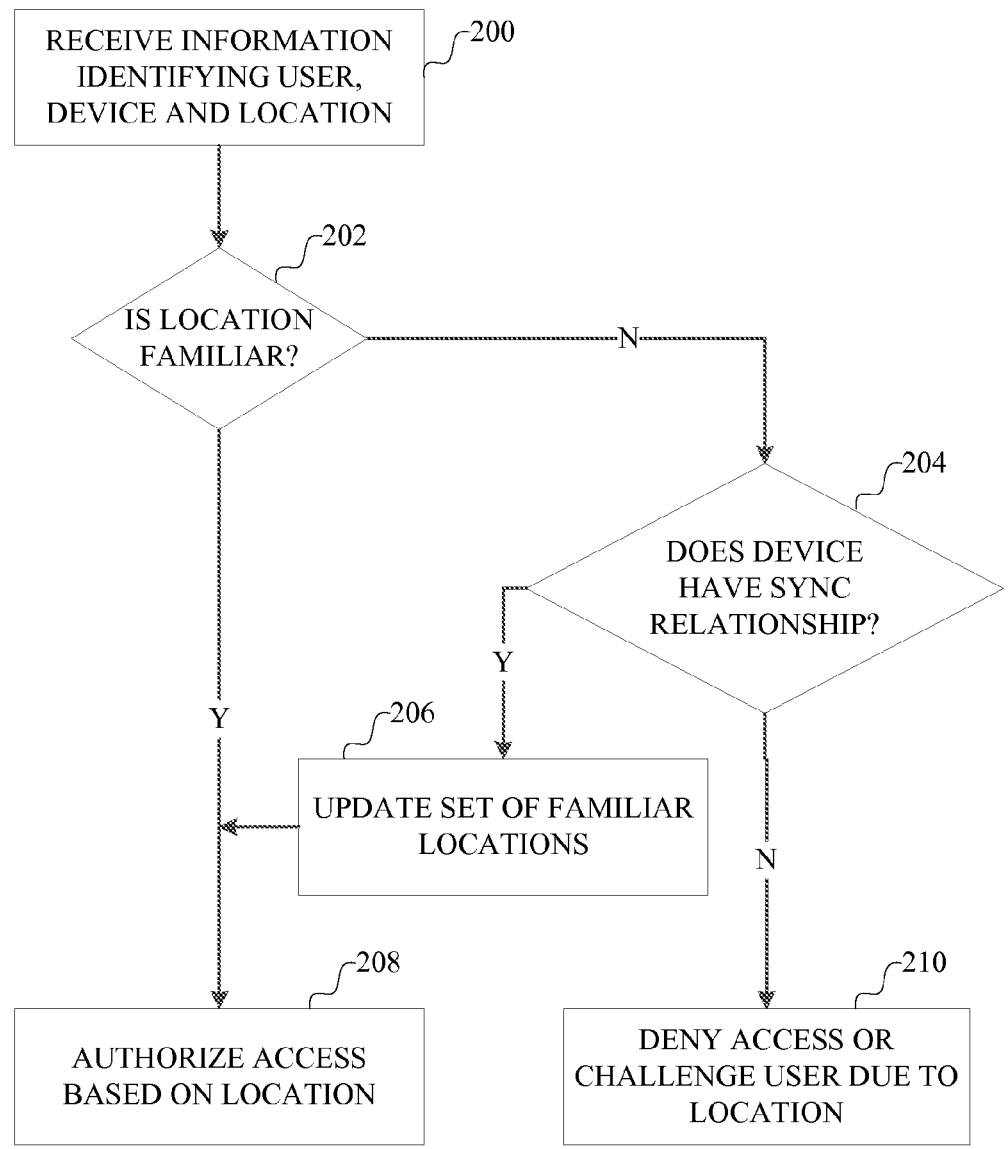
FIG. 2 is a flow chart illustrating an example implementation of using synchronization information to augment location-based authentication.

Referring now to FIG. 2, a flowchart describing checking for a relationship for a device will now be described. The authentication process for a service receives 200 into memory information identifying a user, a device used by the user to access the service, and a location in which the device is being used. The authentication process then determines 202 whether the location is among a set of familiar locations stored about the user for the service being accessed by the user. For example, the authentication process can implement a database lookup to identify the set of familiar locations stored for the user, and then can perform a search on that set for the given location. The authentication process also determines 204 whether the device has a relationship established with the service being accessed. If the device has a relationship established with the service being accessed, then the authentication process updates 206 the set of familiar locations to include the location in which the device is being used. Access to the service can be authorized 208 if the given location is in the set of familiar locations, whether originally Or after being updated based on the relationship information.

Figure 3:
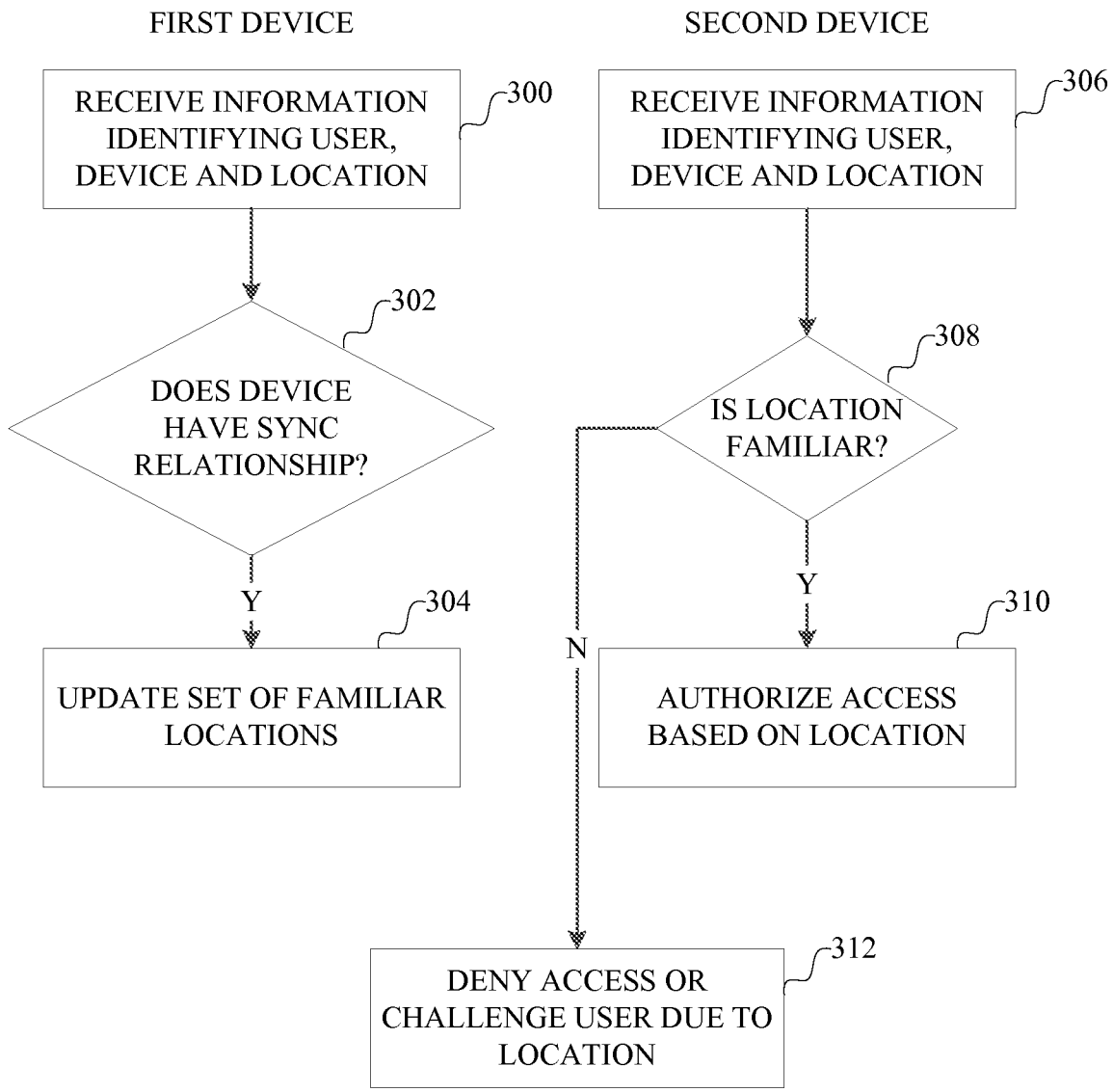
FIG. 3 is a flow chart illustrating another example implementation of using synchronization information.

Referring now to FIG. 3, a flowchart describing how a second device can utilize the relationship of another device will now be described.

The authentication process for a service receives 300 into memory information identifying a user, a first device, such as a smart phone, used by the user to access the service, and a location in which the device is being used. The authentication process determines 302 whether the first device has a relationship established with the service being accessed. If the first device has a relationship established with the service being accessed (which is the case in this example that shows how the relationship between the first device and the service benefits the second device), then the authentication process updates 304 the set of familiar locations for the user to include the location in which the first device is being used.

Subsequently, the user attempts to access the service with a second device, such as a laptop or tablet computer, in the same location. The authentication process for the service receives 306 into memory information identifying a user, a device used by the user to access the service, and a location in which the device is being used. The authentication process then determines 308 whether the location is among a set of familiar locations stored about the user for the service being accessed by the user. Assuming that the location update due to the activity of with the first device is successful, the new location is in the database, and access to the service will not be denied 310 due to the new location. It is possible to allow or disallow access at a new location even if the new location is in the database by further considering the type of request being made by the device. If the location update was not successful, access will not be authorized 312 due to the new location, and the user may be prompted for additional information.

Figure 4:
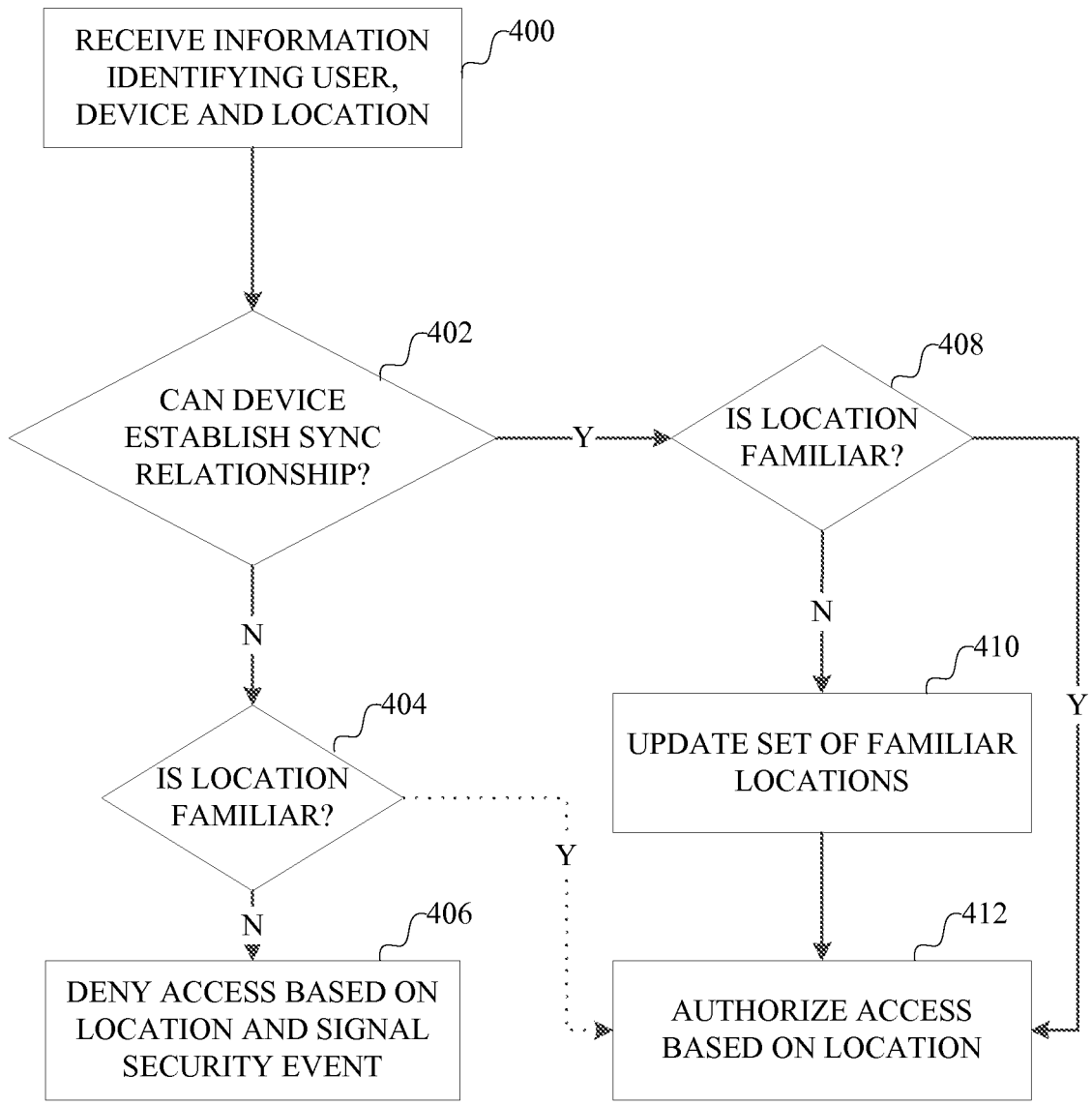
FIG. 4 is a flow chart illustrating another example implementation of using synchronization information.

In FIG. 4, a flowchart describing how an attempt to establish a synchronization relationship can be used will now be described.

The authentication process receives 400 information identifying a user, a device and a location in which the device is being used. Next, the authentication process receives 402 a request from the device to establish a synchronization relationship with the service being accessed. If the attempt is unsuccessful as determined at 402, it is next determined 404 whether the location is among a set of familiar locations stored about the user for a service being accessed by the user through the device. If the location is unfamiliar and the synchronization attempt is unsuccessful, then a security event can be signaled 406, such as by notifying the user and/or a system administrator. If the location is familiar, then authorization based on location can be allowed (as noted at 412), however, the system might take other authorization steps before allowing access to the service.

If the synchronization attempt is successful, then it is determined 408 whether the location is among the set of familiar locations. If the second device is successful in establishing anew synchronization relationship from a location that is not among the set of familiar locations, then the set of familiar locations is updated 410 to include the location of the second device. With the device being in a familiar location, the access to the service based on location can be authorized 412.

With this use of a relationship, such as a synchronization relationship, to infer that a device is trusted, the location in which the device is being used can be considered trusted in a system that uses location-based authentication. Such usage provides a desirable user experience by not denying access when a user is in a new location with a trusted device. Additionally, the combination of location information and attempts at establishing a relationship can be used to signal security events to a user or system administrator.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 5:
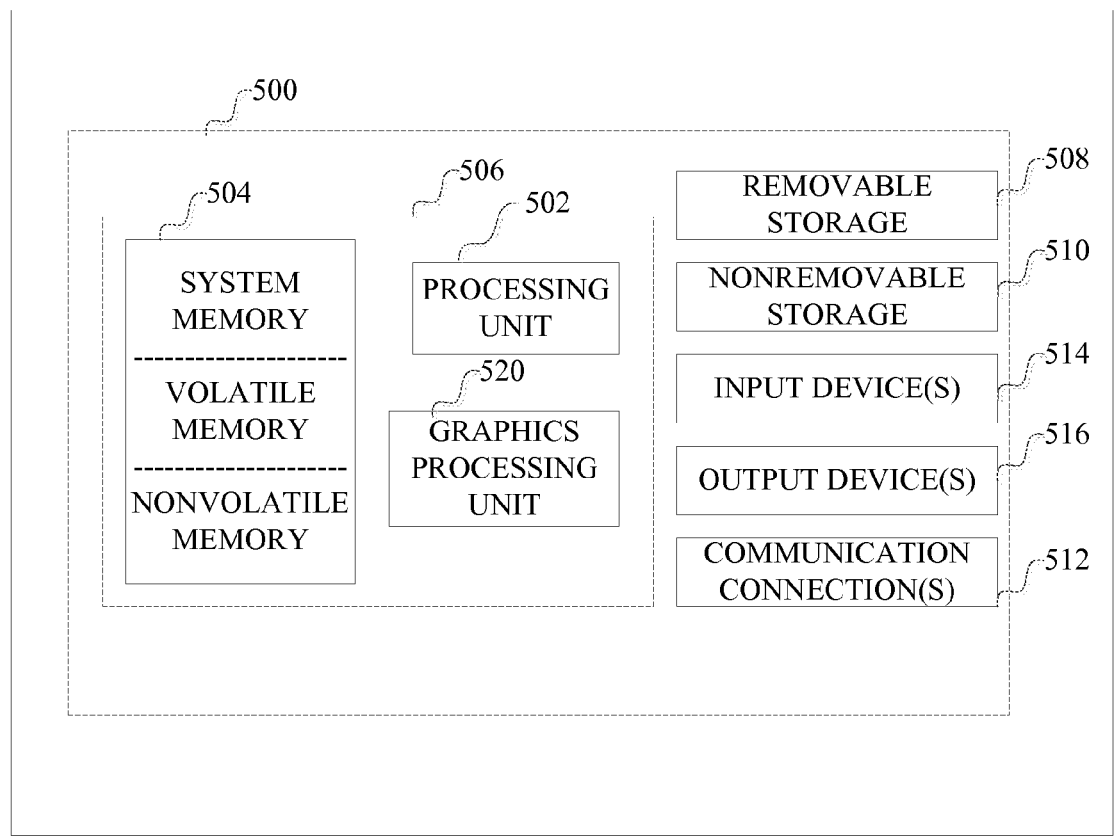
FIG. 5 is a block diagram of an example computing device in which such a system can be implemented.

FIG. 5 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 5, an example computing environment includes a computing machine, such as computing machine 500. In its most basic configuration, computing machine 500 typically includes at least one processing unit 502 and memory 504. The computing device may include multiple processing units and/or additional co-processing units such as graphics processing unit 520. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, computing machine 500 may also have additional features/functionality. For example, computing machine 500 may also include additional storage (removable and/or non-removable) including, but not limited to, magnetic or optical disks or tape. Such additional storage is illustrated FIG. 5 by removable storage 508 and non-removable storage 510. Computer storage media includes volatile and nonvolatile, removable and non-removable media implemented in any method or technology for storage of information such as computer program instructions, data structures, program modules or other data. Memory 504, removable storage 508 and non-removable storage 510 are all examples of computer storage media. Computer storage media includes, but is not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 500. Any such computer storage media may be part of computing machine 500, Computing machine 500 may also contain communications connection(s) 512 that allow the device to communicate with other devices. Communications connection(s) 512 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 500 may have various input device(s) 514 such as a keyboard, mouse, pen, camera, touch input device, and so on. Output device(s) 516 such as a display, speakers, a printer, and so on may also be included. All of these devices are well known in the art and need not be discussed at length here.

The input and output devices can be part of a natural user interface (NUI). NUI may be defined as any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence. Example categories of NUI technologies include, but are not limited to, touch sensitive displays, voice and speech recognition, intention and goal understanding, motion gesture detection using depth cameras (such as stereoscopic camera systems, infrared camera systems, RGB camera systems and combinations of these), motion gesture detection using accelerometers, gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Such a system can be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc, The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by an authentication process for a service accessible over a computer network, comprising:
    receiving information identifying a user, a first device from which the user is currently accessing the service, and a geographic location in which the first device is currently being used, into memory;
    determining whether the geographic location of the first device is among a set of authorized locations, from which the user has previously accessed the service, and stored for the user for the service;
    determining whether the first device has a relationship previously established with the service being accessed, the relationship being a kind of relationship in which the service communicates with a device that is known and trusted by the service;
    in response to a determination that the first device has the relationship established with the service being accessed, adding the geographic location in which the first device is currently being used to the stored set of authorized locations for the user and allowing the first device to access the service from the geographic location in which the first device is currently being used;
    receiving information identifying a user, a second device, different from the first device, and a geographic location in which the second device is currently being used, into memory; and
    determining whether the geographic location of the second device is among the set of authorized locations stored for the user for the service being accessed as updated according to the geographic location of the first device; and
    in response to a determination that the geographic location of the second device is among the set of authorized locations stored for the user as updated according to the geographic location of the first device, allowing access to the service through the second device.

2. The computer-implemented process of claim 1, further comprising:
    in response to a determination that the first device does not have the relationship established with the service being accessed, and a determination that the geographic location of the first device is not among the set of authorized locations stored for the user, signaling a security event.

3. The computer-implemented process of claim 1, further comprising:
    in response to a determination that the geographic location of the second device is not among the set of authorized locations stored for the user as updated according to the geographic location of the first device, not allowing the second device to access the service from the geographic location.

4. The computer-implemented process of claim 3, further comprising:
    in response to a determination that the geographic location of the second device is not among the set of authorized locations stored for the user as updated according to the geographic location of the first device, prompting the user of the second device for additional information to authenticate the user.

5. The computer-implemented process of claim 1, further comprising:
    receiving a request from the second device to establish the relationship with the service being accessed; and
    determining whether the geographic location of the second device is among the set of authorized locations stored for the user for the service being accessed; and
    signaling a security event in response to determinations that the second device is unsuccessful in establishing the relationship with the service from the geographic location and that the geographic location of the second device is not among the set of authorized locations stored for the user for the service.

6. The computer-implemented process of claim 1, further comprising:
    receiving a request from the second device to establish the relationship with the service being accessed; and
    determining whether the geographic location of the second device is among the set of authorized locations stored for the user for the service being accessed; and
    in response to determinations that the second device is successful in establishing the relationship with the service from the geographic location and that the geographic location is not among the set of authorized locations, adding the geographic location in which the second device is currently being used to the set of authorized locations for the user.

7. An article of manufacture comprising:
    a computer storage medium including at least one of a memory and a storage device;
    computer program instructions stored on the computer storage medium which, when processed by a processing device, instruct the processing device to perform an authentication process for a service accessible over a computer network, comprising:
    receiving information identifying a user, a first device from which the user is currently accessing the service, and a geographic location in which the first device is currently being used, into memory;
    determining whether the geographic location of the first device is among a set of authorized locations, from which the user has previously accessed the service, and stored for the user for the service;

determining whether the first device has a relationship previously established with the service being accessed, the relationship being a kind of relationship in which the service communicates with a device that is known and trusted by the service;

in response to a determination that the first device has the relationship established with the service being accessed, adding the geographic location in which the first device is currently being used to the set of authorized locations for the user and allowing the first device to access the service from the geographic location in which the first device is currently being used;

receiving information identifying a user, a second device, different from the first device, and a geographic location in which the second device is currently being used, into memory; and determining whether the geographic location of the second device is among the set of authorized locations stored for the user for the service being accessed as updated according to the geographic location of the first device; and in response to a determination that the geographic location of the second device is among the set of authorized locations stored for the user as updated according to the geographic location of the first device, allowing access to the service through the second device.

8. The article of manufacture of claim 7, wherein the process further comprises:

in response to a determination that the first device does not have the relationship established with the service being accessed, and a determination that the geographic location of the first device is not among the set of authorized locations stored for the user, signaling a security event.

9. The article of manufacture of claim 7, wherein the process further comprises:

in response to a determination that the geographic location of the second device is not among the set of authorized locations stored for the user, not allowing the second device to access the service from the geographic location.

10. The article of manufacture of claim 9, wherein the process further comprises:

in response to a determination that the geographic location of the second device is not among the set of authorized locations stored for the user, prompting the user of the second device for additional information to authenticate the user.

11. The article of manufacture of claim 7, wherein the process further comprises:

receiving a request from the second device to establish the relationship with the service being accessed; and determining whether the geographic location of the second device is among the set of authorized locations stored for the user for the service being accessed; and signaling a security event in response to determinations that the second device is unsuccessful in establishing the relationship with the service from the geographic location and that the geographic location of the second device is not among the set of authorized locations stored for the user for the service.

12. The article of manufacture of claim 7, wherein the process further comprises:

receiving a request from the second device to establish the relationship with the service being accessed; and determining whether the geographic location of the second device is among the set of authorized locations stored for the user for the service being accessed; and in response to determinations that the second device is successful in establishing the relationship with the service from the geographic location and that the geographic location is not among the set of authorized locations, adding the geographic location in which the second device is currently being used to the set of authorized locations for the user.

13. A computing machine comprising:

an authentication process, executed on the computing machine, for a service accessible over a computer network, having inputs for receiving information identifying a user, a first device from which the user is currently accessing the service and a geographic location in which the first device is currently being used, into memory;

storage in which data is stored about users for the service including data describing, for each user, a set of authorized locations from which the user has previously accessed the service;

storage in which data is stored describing relationships between devices and the service, the data associating devices with user accounts with the service for a relationship in which the service communicates with a device that is known and trusted by the service;

the authentication process determining whether the first device has the relationship previously established with the service being accessed;

in response to a determination that the first device has the relationship previously established with the service being accessed, the authentication process adding the geographic location in which the first device is currently being used to the set of authorized locations for the user and allowing the first device to access the service from the geographic location in which the first device is currently being used;

the authentication process further comprising an input configured to receive information identifying a user, a second device, different from the first device, and a geographic location in which the second device is currently being used, into memory;

the authentication process configured to determine whether the geographic location of the second device is among the set of authorized locations stored for the user for the service being accessed as updated according to the geographic location of the first device, and, in response to a determination that the geographic location of the second device is among the set of authorized locations stored for the user as updated according to the geographic location of the first device, to allow access to the service through the second device.

14. The computing machine of claim 13, wherein the authentication process determines whether the first device is accessing the service from a geographic location in the set of authorized locations.

15. The computing machine of claim 13, wherein the authentication process signals a security event if the first device is unsuccessful in establishing the relationship with the service from the geographic location of the first device.

16. The computing machine of claim 13, wherein the authentication process prompts the user for additional information if the geographic location of the first device is not in the set of authorized locations.

17. The computing machine of claim 13, wherein the authentication process is further configured to:
- receive a request from the second device to establish the relationship with the service being accessed;
- determine whether the geographic location of the second device is among the set of authorized locations stored for the user for the service being accessed; and
- in response to determinations that the second device is successful in establishing the relationship with the service from the geographic location and that the geographic location is not among the set of authorized locations, add the geographic location in which the second device is currently being used to the set of authorized locations for the user.

* * * * *